United States Patent
Scott

[11] 3,904,161
[45] Sept. 9, 1975

[54] CLAMP FOR ATTACHING UMBRELLA TO LAWN CHAIR

[76] Inventor: Norman D. Scott, Rt. 2, Box 409, Dayton Beach, Fla. 32019

[22] Filed: Aug. 15, 1974

[21] Appl. No.: 497,631

[52] U.S. Cl. ............... 248/43; 248/226; 403/391; 403/400
[51] Int. Cl.² .......................................... F16B 2/02
[58] Field of Search ......... 248/41, 229, 226 D, 230, 248/40, 221, 43, 42; 403/385, 391, 400, 389; 135/7; 24/81 CR; 269/41, 97, 98

[56] References Cited
UNITED STATES PATENTS

| | | | |
|---|---|---|---|
| 1,279,669 | 9/1918 | Deming | 248/41 |
| 2,178,655 | 11/1939 | Strandt | 248/41 |
| 3,050,280 | 8/1962 | Regan | 248/40 |

Primary Examiner—Andrew V. Kundrat
Attorney, Agent, or Firm—Clarence A. O'Brien; Harvey B. Jacobson

[57] ABSTRACT

A clamp including a pair of generally mirror image mounting blocks is provided. The blocks are disposed in front to rear relatively reversed side by side juxtaposition with corresponding first end portions of the blocks defining generally semi-cylindrical recesses opening toward each other and registered with each other to define a generally cylindrical cavity. Corresponding remote end portions of the blocks include open ended elongated and end aligned channel recesses formed therein opening laterally endwise outwardly of the corresponding end portions of the block and the channel recesses extend along a path disposed at generally right angles relative to the center line of the cylindrical cavity defined by the semi-cylindrical recesses. A clamp screw is rotatably and slidably received through a first bore formed transversely through one of the blocks between the opposite end portion thereof and corresponding semi-cylindrical and channel recesses and generally paralleling the channel recesses. The clamp screw is threadedly engaged in a threaded transverse bore formed in the other block and aligned with the first bore for clamping the blocks together with the semi-cylindrical recesses tightly and clampingly engaging the upper tubular cross portion of the back of a folding chair therebetween for stationary support of the mounting blocks from the chair. One of the blocks has a set screw threaded through the portion thereof defining one side of the corresponding recess with the set screw generally paralleling the cylindrical cavity and the set screw is operative to clampingly engage the handle or lower shaft portion of an umbrella extending through the channel recesses for support of the umbrella from the clamp, whereby the unbrella may be supported in upright operative position to shield at least the torso portion of a person seated in the chair.

6 Claims, 4 Drawing Figures

PATENTED SEP 9 1975  3,904,161

3,904,161

CLAMP FOR ATTACHING UMBRELLA TO LAWN CHAIR

BACKGROUND OF THE INVENTION

Various types of support clamps have been heretofore designed for mounting upon a cylindrical support member and for the purpose of supporting a generally cylindrical article therefrom disposed at generally right angles relative to the cylindrical support member. Examples of previously patented devices of this type may be found in U.S. Pat. Nos. 640,446, 1,132,544, 1,279,669, 1,760,592, 2,178,655, 2,392,932 and 3,050,280.

However, the clamp structure of the instant invention is believed to comprise a superior clamp assembly in that it utilizes two main clamping components which are substantially mirror images of each other and which may thus be readily constructed on a mass production basis. The clamp of the instant invention is easy to use and is constructed in a manner whereby use over an extended period of time will not result in flexure or fatigue of the clamping components rendering them less effective after each subsequent usage thereof.

BRIEF DESCRIPTION OF THE INVENTION

The clamp assembly of the instant invention utilizes solid block components except for the recesses formed therein in which related workpieces are to be clamped and the block components comprise substantially mirror images of each other and thus are readily produced.

Further, the clamp construction has been specifically designed for use in a particular environment and is therefore very well suited to perform its intended task.

The main object of this invention is to provide a clamp for attaching an umbrella shank portion or shaft portion to the upper cross member of a tubular folding chair.

Another object of this invention, in accordance with the immediately preceding objects, is to provide a clamp structure constructed in a manner whereby the supported umbrella may be readily variously inclined relative to the associated folding chair.

A still further object of this invention is to provide a clamp structure which may be easily used.

Another very important object of this invention is to provide a clamp structure having adjustment capabilities adapting it for use in conjunction with various types of folding chairs and umbrellas having various size handle or shank portions.

A final object of this invention to be specifically enumerated herein is to provide a clamp in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
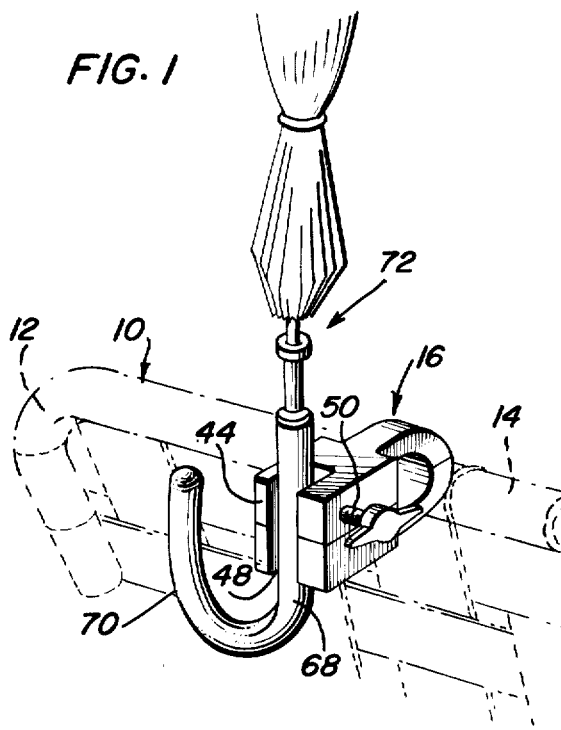
FIG. 1 is a perspective view of the clamp structure of the instant invention operatively associated with the handle of a conventional umbrella and with the upper transverse member of a tubular chair illustrated in phantom lines in operative association with the clamp for supporting the latter and the umbrella from the chair.

Referring now more specifically to the drawings, the numeral 10 generally designates as a conventional form of folding chair including a tubular frame 12 having an upper horizontal transverse member 14 at the upper portion of the back of the chair.

The clamp assembly of the instant invention is referred to in general by the reference numeral 16 and includes a pair of substantially mirror image clamp blocks 18 and 20. The block 18 includes first and second ends 22 and 24 and the block includes corresponding first and second ends 26 and 28. The ends 22 and 26 of the blocks 18 and 20 define reduced width jaw portions having semi-cylindrical recesses 32 and 36 formed therein. The recesses 32 and 36 open laterally outwardly through inner sides 38 and 40 of the blocks 18 and 20 and the inner sides 38 and 40 are disposed in juxtaposition with the semi-cylindrical recesses 32 and 36 registered with each other and together forming a generally cylindrical cavity open at its opposite ends. The other pair of ends 24 and 28 of the blocks 18 and 20 have open ended and aligned transverse channel recesses 44 and 48 formed therein opening laterally outwardly through the ends 24 and 28.

Figure 2:
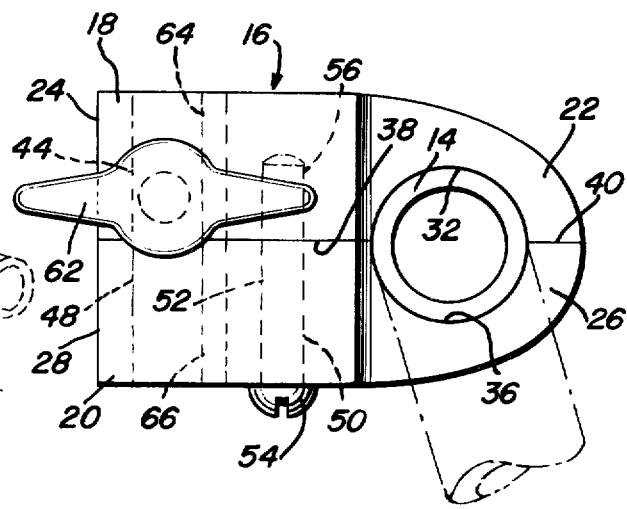
FIG. 2 is an enlarged side elevational view of the assemblage illustrated in FIG. 1 as seen from the right side thereof and with the umbrella removed.
Figure 3:
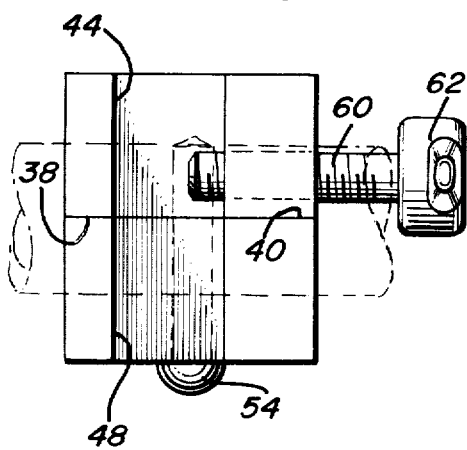
FIG. 3 is an enlarged elevational view of the clamp structure as seen from the right side of FIG. 2.
Figure 4:
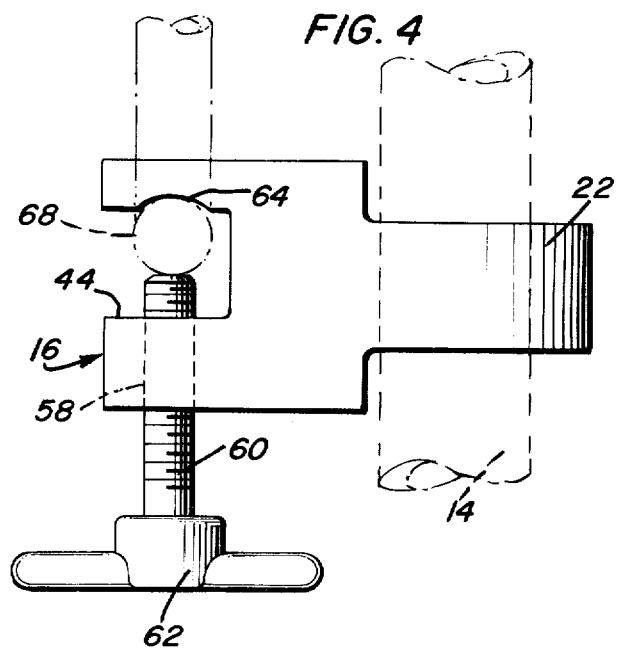
FIG. 4 is a top plan view of the clamp structure.

From the preceding and FIGS. 1 and 2 of the drawings, it will be noted that the recesses 44 and 48 extend along a path disposed at substantially right angles to the center axis of the generally cylindrical cavity defined by the semi-cylindrical recesses 32 and 36.

The block 20 has a transverse bore 50 formed therethrough intermediate the semi-cylindrical recess 36 and the channel recess 48, the bore 50 generally paralleling the channel recesses 44 and 48, and slidingly and rotatingly receives the threaded shank portion 52 of a headed fastener 54 therethrough. The inner side 38 of the block 18 has the outer end of a threaded blind bore 56 opening outwardly thereof and the blind bore 56 is registered with the bore 50. The inner end of the threaded shank 52 of the fastener 54 is threadedly engaged in the blind bore 56 and the fastener 54 thereby serves to clamp the blocks 18 and 20 together and the clamp 16 about any cylindrical support member such as the upper transverse member 14 of the frame 12 which is of a diameter slightly greater than the diameter of the generally cylindrical cavity defined by the semi-cylindrical recesses 32 and 36.

Also, the block 18 has a threaded bore 58 formed therethrough at generally right angles to the channel recess 44 and the free end portion of the threaded shank 60 of a winged set screw 62 is threaded through the bore 58 and projects into the channel recess 44.

That portion of the block 18 defining the side of the channel recess 44 opposite the side thereof into which the shank portion 60 of the set screw 62 projects is provided with a partial cylindrical recess 64 and the corresponding portion of the block 20 is provided with a similar partial cylindrical recess 66.

In operation, the fastener 54 is loosened to the extent that the upper transverse member 14 of the frame 12 may be received between the jaws 22 and 26 in registry with the semi-cylindrical recesses 32 and 36. Then, the fastener 54 is tightened in order to clamp the bodies 18 and 20 about the member 14. Then, the set screw 62 is backed out until the inner end thereof is flush with the corresponding side of the channel recess 44 and the base end 68 of the hooked handle 70 of a conventional umbrella referred to in general by the reference numeral 72 is disposed within the channel recesses 44 and 46 and the partial cylindrical recesses 64 and 66 formed therein. Thereafter, the set screw 62 is threaded inwardly into engagement with the handle 70 in order to clamp the umbrella 72 in position against displacement relative to the clamp 16. In this manner, the umbrella 72 is supported in a stationary manner from the frame 12 of the chair 10. Of course, the fastener 54 may be loosened and the clamp 16 may be angularly displaced about the upper horizontal transverse member 14 of the frame 12 to incline the umbrella 72 in any desired position after which the fastener 54 may again be tightened.

It is pointed out that after the fastener 54 is tightened and during the process of tightening the set screw 62 slight compression of the portion 68 of the handle 70 will occur between the end of the set screw 62 and the opposing partial cylindrical recess 64. Thus, as the set screw 62 is tightened, the block 20 may be slightly angularly displaced about the center axis of the fastener 54, and this slight angular displacement will cause the jaws 22 and 26 of the blocks 18 and 20 to more tightly grip the upper horizontal transverse member 14 of the frame 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A clamp including a pair of elongated clamp blocks each including an inner side and an outer side and opposite ends, adjacent one pair of corresponding ends of said blocks there extends open ended laterally outwardly opening generally semi-cylindrical transversely extending recesses therein, opening laterally outwardly through said inner sides, said blocks being relatively positioned with said inner sides disposed in engagement and said recesses registered with and opening laterally toward each other to define a generally cylindrical cavity open at its opposite ends, the other pair of corresponding ends of said blocks each having an open ended elongated generally rectangular channel shape recess; with said channel shaped recesses extending across the end surfaces with the channel openings intersecting the end surfaces of each block and with said channel recesses extending axially aligned along a path disposed transverse to the center axis of said cavity, the portions of one of said blocks defining one side of the corresponding channel recess having a set screw threaded therethrough with said set screw projecting into said corresponding channel recess from one side thereof and extending transversely of said corresponding channel recess, and means connected between said blocks operative to clamp said blocks together.

2. The combination of claim 1 wherein said blocks comprise solid block members.

3. The combination of claim 1 wherein said means connected between said blocks comprises a threaded clamp screw slidingly and rotatably received transversely through a mid-portion of the other of said blocks and threadedly engaged with said one block.

4. The combination of claim 3 wherein said other block includes a transverse bore extending therethrough intermediate its opposite ends and the corresponding semi-cylindrical and channel recesses, a clamp screw slidingly and rotatably received through said transverse bore, and a threaded bore formed in said one block generally paralleling the corresponding channel recess, opening through the inner side of said one block and end aligned with said transverse bore, said clamp screw being threaded in said threaded bore.

5. The combination of claim 4 wherein said threaded bore comprises a blind bore.

6. The combination of claim 1 wherein the channel recess formed in said one block includes a partial cylindrical recess formed in one longitudinal side wall thereof extending longitudinally of said channel recesses, opening toward said set screw and having its axis of curvature at least substantially intersecting the center axis of said set screw.

* * * * *